US011856180B1

(12) United States Patent
Morgenstein et al.

(10) Patent No.: US 11,856,180 B1
(45) Date of Patent: Dec. 26, 2023

(54) SYSTEMS AND METHODS FOR PERFORMING TEMPERATURE-DEPENDENT REFERENCE IMAGE CORRECTION FOR LIGHT PROJECTORS

(71) Applicant: Apple Inc., Cupertino, CA (US)

(72) Inventors: Boris Morgenstein, Tel Aviv (IL); Assaf Avraham, Givaataim (IL); David Pawlowski, Tel Aviv (IL); Gidi Lasovski, Ramat Hasharon (IL); Refael Della Pergola, Jerusalem (IL); Tom Levy, Holon (IL); Yohai Zmora, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/810,098

(22) Filed: Jun. 30, 2022

(51) Int. Cl.
  *H04N 13/254* (2018.01)
  *G06T 7/521* (2017.01)
  *G01B 11/00* (2006.01)
  *G06T 5/00* (2006.01)
  *G01B 11/25* (2006.01)

(52) U.S. Cl.
  CPC ....... *H04N 13/254* (2018.05); *G01B 11/2504* (2013.01); *G06T 5/006* (2013.01); *G06T 7/521* (2017.01)

(58) Field of Classification Search
  None
  See application file for complete search history.

(56) References Cited

U.S. PATENT DOCUMENTS

| | | | |
|---|---|---|---|
| 8,493,496 B2 | 7/2013 | Freedman | |
| 8,749,796 B2 | 6/2014 | Pesach | |
| 9,400,177 B2 | 7/2016 | Pesach | |
| 2008/0165341 A1* | 7/2008 | Dillon | G01B 11/2441 359/578 |
| 2012/0050488 A1 | 3/2012 | Cohen | |
| 2015/0124055 A1* | 5/2015 | Kotake | G01B 11/2513 348/46 |
| 2022/0364849 A1* | 11/2022 | Yosub | G01B 11/22 |

* cited by examiner

*Primary Examiner* — Edemio Navas, Jr.
(74) *Attorney, Agent, or Firm* — Blank Rome LLP

(57) ABSTRACT

One disclosed embodiment includes techniques for temperature-dependent reference image correction in structured light projectors that may be used for generating three-dimensional (3D) scene depth maps. The techniques disclosed herein include receiving an indication of a temperature (e.g., an actual current operating temperature or a change in the current operating temperature relative to an established reference temperature) associated with one or more components of a projector and then determining, based on the temperature indication, an amount of adjustment needed to correct a reference pattern image based on an estimated effective focal length change of the projector. Next, a reference pattern image may be appropriately adjusted, e.g., based on the determined amount of effective focal length adjustment caused by the current operating temperature of the projector, to generate a corrected reference image, which may then be used to generate a more accurate 3D scene depth maps at the projector's current operating temperature.

20 Claims, 6 Drawing Sheets

SENSOR PLANE – EFFECT OF WAVELENGTH CHANGE

NA SPACE – EFFECT OF WAVELENGTH CHANGE

SYSTEMS AND METHODS FOR PERFORMING TEMPERATURE-DEPENDENT REFERENCE IMAGE CORRECTION FOR LIGHT PROJECTORS

BACKGROUND

The disclosed subject matter relates to the field of image processing. More specifically, but not by way of limitation, the disclosed subject matter relates to correcting an image of a projected pattern, e.g., a pattern that has been thermally distorted.

Increasingly, computers and other computational devices have been making use of depth sensing to gather information about the environment around the device to offer users a more immersive experience. In some cases, depth sensing may be performed using structured light projection. In structured light projection, a known pattern of light may be projected into the environment around the device, and an image of the environment and projected pattern may be captured. When captured by a camera under reference lighting and temperature conditions, the captured image of the known pattern of light may be referred to herein as a "reference image." The known pattern of light as captured in a reference image appears to deform due to light striking surfaces at various distances and orientations within the environment, e.g., due to the "parallax effect," i.e., the displacement or difference in the apparent position of an object when viewed along two different lines of sight. The way and degree to which the known pattern of light deforms, as shown in the captured image, is used to help calculate scene depth and surface shape information.

As information about the environment is captured based on the deformation of the captured projected pattern, time-dependent distortion of the projected pattern is problematic. In some cases, heat can cause distortion of the projected light pattern, for example, due to thermal expansion of components of the light projector or changes in the refractive index in the projector's lens and/or laser cavity. Therefore, techniques to correct for temperature-induced distortion of the projected light pattern may be useful.

SUMMARY

One disclosed embodiment includes a technique for image thermal correction. This technique includes receiving an indication of a temperature of a projector, e.g., an indication of an amount of change in temperature of the projector relative to the measured temperature of the projector when a reference image was captured. The technique further includes determining, based on the temperature indication, to correct for an effective focal length (EFL) change of the projector. The technique also includes determining an amount of effective focal length adjustment based on the temperature indication. The technique further includes receiving a reference image and correcting the reference image to generate a corrected reference image, based on the determined amount of effective focal length adjustment.

Another aspect of the present disclosure relates to a non-transitory program storage device comprising instructions stored thereon to cause one or more processors to correct an image. The instructions cause the one or more processors to receive an indication of a temperature of a projector, e.g., an indication of an amount of change in temperature of the projector relative to the measured temperature of the projector when a reference image was captured, as described above. The instructions also cause the one or more processors to determine, based on the temperature indication, to correct for a effective focal length change of the projector. The instructions further cause the one or more processors to determine an amount of effective focal length adjustment based on the temperature indication. The instructions also cause the one or more processors to receive a reference image and correct the reference image to generate a corrected reference image based on the determined amount of effective focal length adjustment.

Another aspect of the present disclosure relates to an electronic device including a memory and one or more processors operatively coupled to the memory. The one or more processors are configured to execute instructions and the instruction cause the one or more processors to receive an indication of a temperature of a projector. The instructions also cause the one or more processors to determine, based on the temperature indication, to correct for an effective focal length change of the projector. The instructions further cause the one or more processors to determine an amount of effective focal length adjustment based on the temperature indication. The instructions also cause the one or more processors to receive a reference image and correct the reference image to generate a corrected reference image based on the determined amount of effective focal length adjustment.

In one embodiment, each of the above-described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

DETAILED DESCRIPTION

Figure 1:
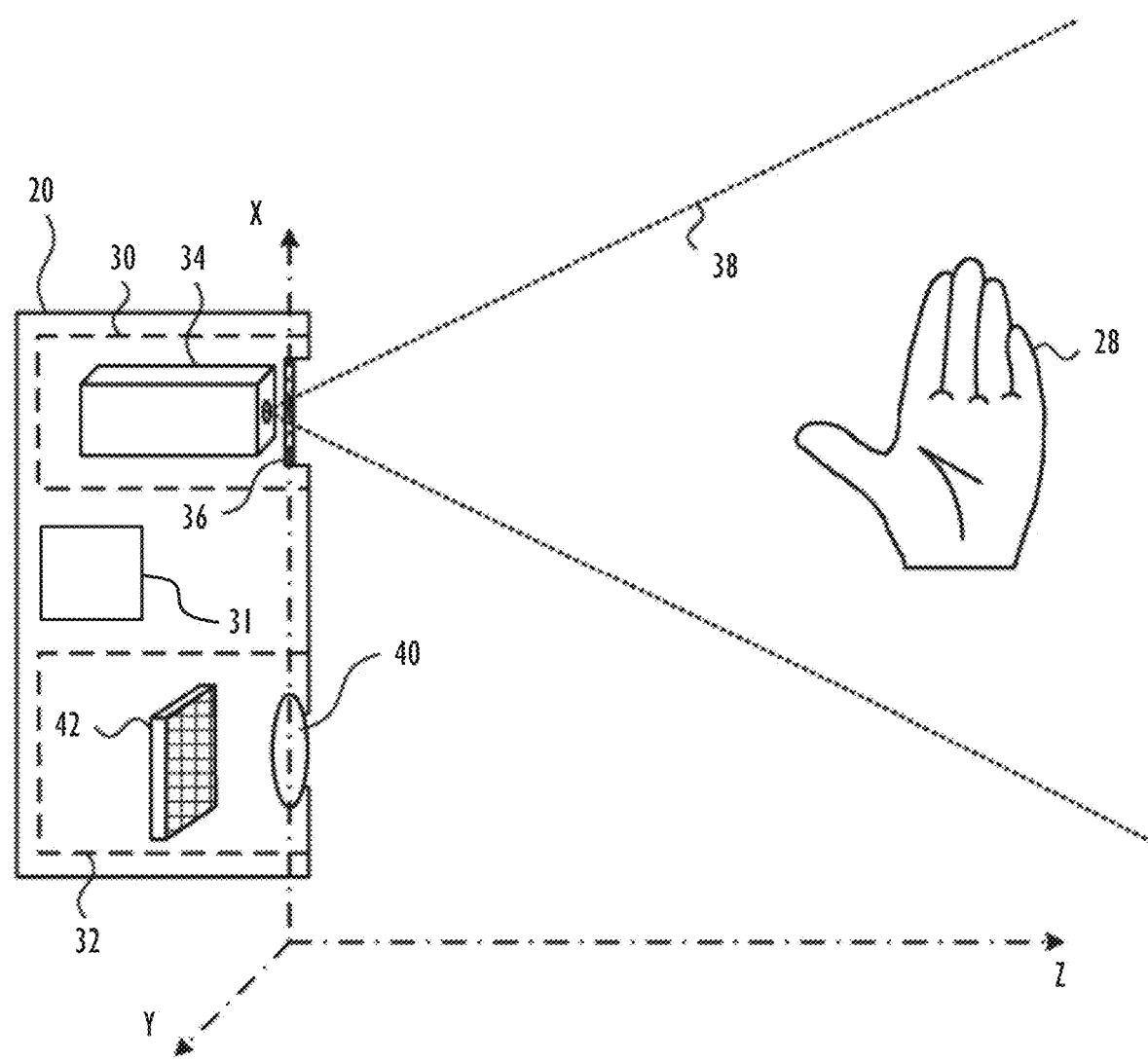
FIG. 1 is a schematic side view of a three-dimensional (3D) mapping system, in accordance with an embodiment of the present invention.

Generally, a light pattern that is projected by patterned beam projector is sensitive to a temperature of the patterned beam projector. For example, thermal expansion of various components of the beam generator and/or changes in the refractive index in the projector's lens or laser cavity may cause the pattern projected by the beam projector to differ from an expected pattern. This expected pattern may be captured by a camera and stored as a reference projected pattern. This stored reference projected pattern may be corrected based on the current temperature of the patterned beam projector to provide a more accurate or "corrected" reference projected pattern for the current temperature of the patterned beam projector, which corrected reference projected pattern may then be used to predict the projector device's behavior at the then-current temperature.

In the following description, for purposes of explanation, numerous specific details are set forth in order to provide a thorough understanding of the invention. It will be apparent, however, to one skilled in the art that the disclosed examples may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment, and multiple references to "one embodiment" or "an embodiment" should not be understood as necessarily all referring to the same embodiment.

As used herein, the term "a computer system" refers to a single computer system or a plurality of computer systems working together to perform the function described as being performed on or by a computer system. Similarly, a machine-readable medium can refer to a single physical medium or to a plurality of media that may together contain the indicated information stored thereon. Reference to a processor refers to a single processing element or to a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming but would nevertheless be a routine undertaking for those of ordinary skill in the design and implementation of systems having the benefit of this disclosure and being of ordinary skill in the design and implementation of computing systems and/or graphic systems.

FIG. 1 is a schematic side view of a 3D mapping system 20, in accordance with an embodiment of the present invention. System 20 is described here as an example implementation of a 3D mapping system that includes temperature-induced distortion correction of a projected light pattern of the sorts described below, and not by way of limitation. The principles of the present invention may similarly be applied in other sorts of optical projection systems that may be subject to temperature-induced distortion.

System 20 comprises a projection assembly 30, which projects a patterned beam 38 onto the surface of an object 28—in this example the hand of a user of the system. An imaging assembly 32 captures an image of the projected pattern on the surface and processes the image, so as to derive a 3D map of the surface. For this purpose, assembly 32 typically comprises objective optics 40 and an image sensor 42, which captures the image, as well as a digital processor 31, which processes the image to generate the 3D map. Details of the image capture and processing aspects of system 20 are described, for example, in U.S. Patent Application Publication 2010/0118123, as well as in U.S. Patent Application Publication 2010/0007717, whose disclosures are incorporated herein by reference.

Projection assembly 30 comprises a projector 34, which projects a patterned illumination beam with a certain FOV, and a field multiplier 36, which expands the projected beam to created patterned beam 38 with a wider FOV, e.g., using a diffraction grating. In this example, the pattern comprises high-contrast light spots on a dark background, in a random or quasi-random arrangement, as explained in the above-mentioned patent application publications. Alternatively, any other suitable type of pattern (including images) may be projected in this fashion. The projector 34 casts a pattern of coded or structured light onto an object for purposes of 3D mapping (e.g., depth mapping). The projector 34 includes a light source (not shown), such as a laser diode, LED, edge emitter, or VCSEL array, that transilluminates a transparency with optical radiation, so as to project a pattern onto the object. As used herein, the terms "optical" and "light" in the present description and in the claims refer generally to any and all of visible, infrared, and ultraviolet radiation. An image capture assembly captures an image of the pattern that is projected onto the object, and a processor processes the image, so as to reconstruct a 3D map of the object. In some implementations, reconstructing the 3D map of the object may comprise the use of a processor that is configured to derive the 3D map of the object by finding respective offsets between a pattern of projected light spots on multiple areas of the object as captured in the image of the scene and their positions in a reference image of the projected light pattern, wherein the respective offsets are indicative of respective distances between the areas and the device capturing the image.

Figure 2:
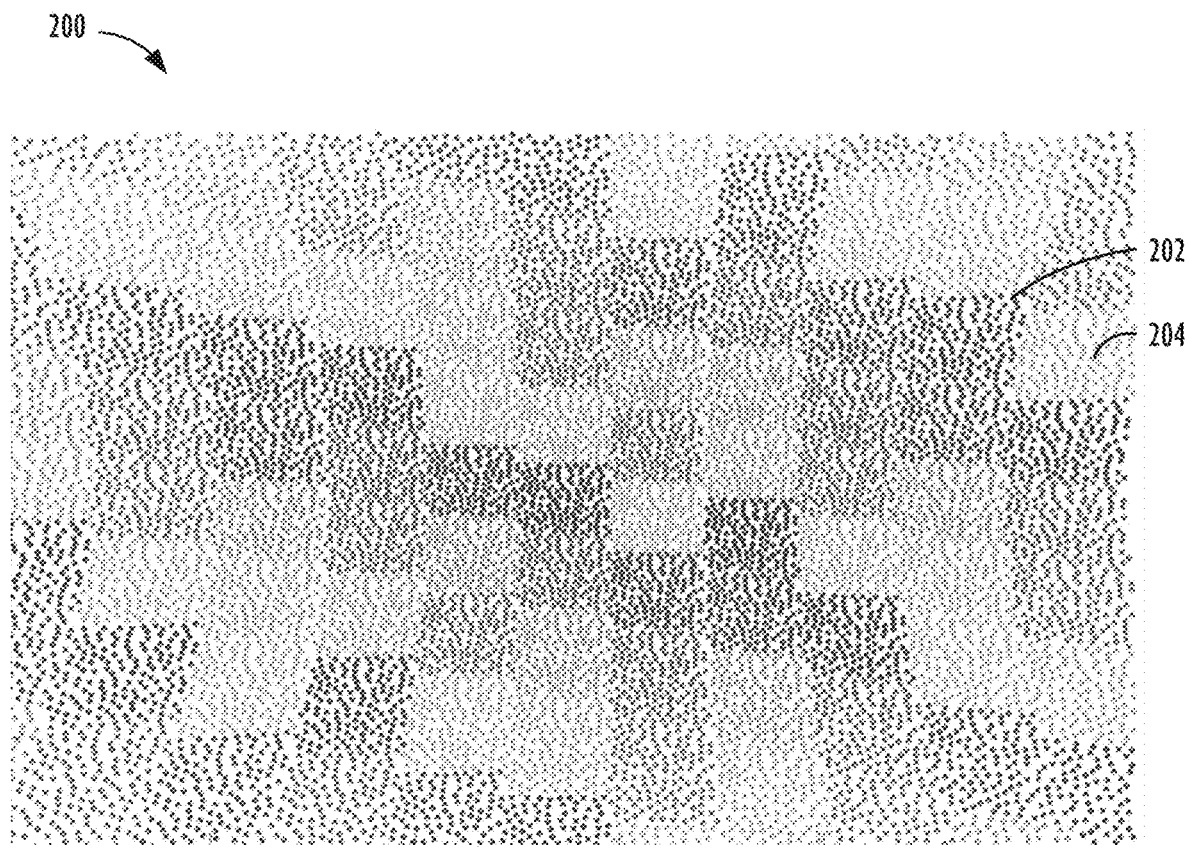
FIG. 2 illustrates an example projected pattern, in accordance with aspects of the present disclosure.

FIG. 2 illustrates an image of an example projected pattern 200, in accordance with aspects of the present disclosure. The projected pattern 200 may be projected by an optical projection module, such as projector 34. The projected pattern 200 in this example is a frontal view of the pattern as projected against a flat surface, such as a wall. The projected pattern 200 includes multiple tiles (e.g., tiles each comprising a plurality of projected light spots) that are laid out in a pattern, where tiles, such as example tile 202, may be offset transversely relative to other neighboring tiles, such as example tile 204, by an offset that is a fraction of the pitch. After the pattern is projected into an environment, an image of the environment and pattern projected into the environment is captured, for example, by the image capture assembly. The imaged pattern, as projected into the environment, is then correlated with a stored reference image of the projected pattern (e.g., 200), wherein the reference image comprises an image of the projected light pattern as projected onto a known object (e.g., a wall) at a known distance, a known orientation relative to the image capture assembly/projector system, and with a known projector temperature. For example, a processor may measure shift as between elements in the imaged pattern and corresponding elements in the stored reference projected pattern 200, e.g., as introduced by parallax-induced shift, to generate an estimated depth map of the environment.

In some cases, the reference projected pattern 200 may change from one projector unit to another projector unit (even those produced by the same manufacturer) due to, for example, small manufacturing differences as between individual components of the projector. To help take these differences into account, the reference projected pattern 200 may be specific to a particular projector unit. The reference projected pattern 200 image may be created (e.g., via projection or synthetic generation) and stored per projector unit, for example, during a manufacturing or calibration process, and stored in a memory associated with the respective projector unit.

In some cases, a temperature of the projector (or, more specifically, a change in the temperature of the projector from a temperature at which the reference projected pattern image was captured) can cause the light pattern, as projected into the environment, to be different from the expected pattern (e.g., one that matches the stored reference projected pattern 200, which, as stated above, is based on the light pattern being projected onto a known object, at a known distance and orientation relative to the projector, as well as at a known temperature of the projector).

Figure 3:
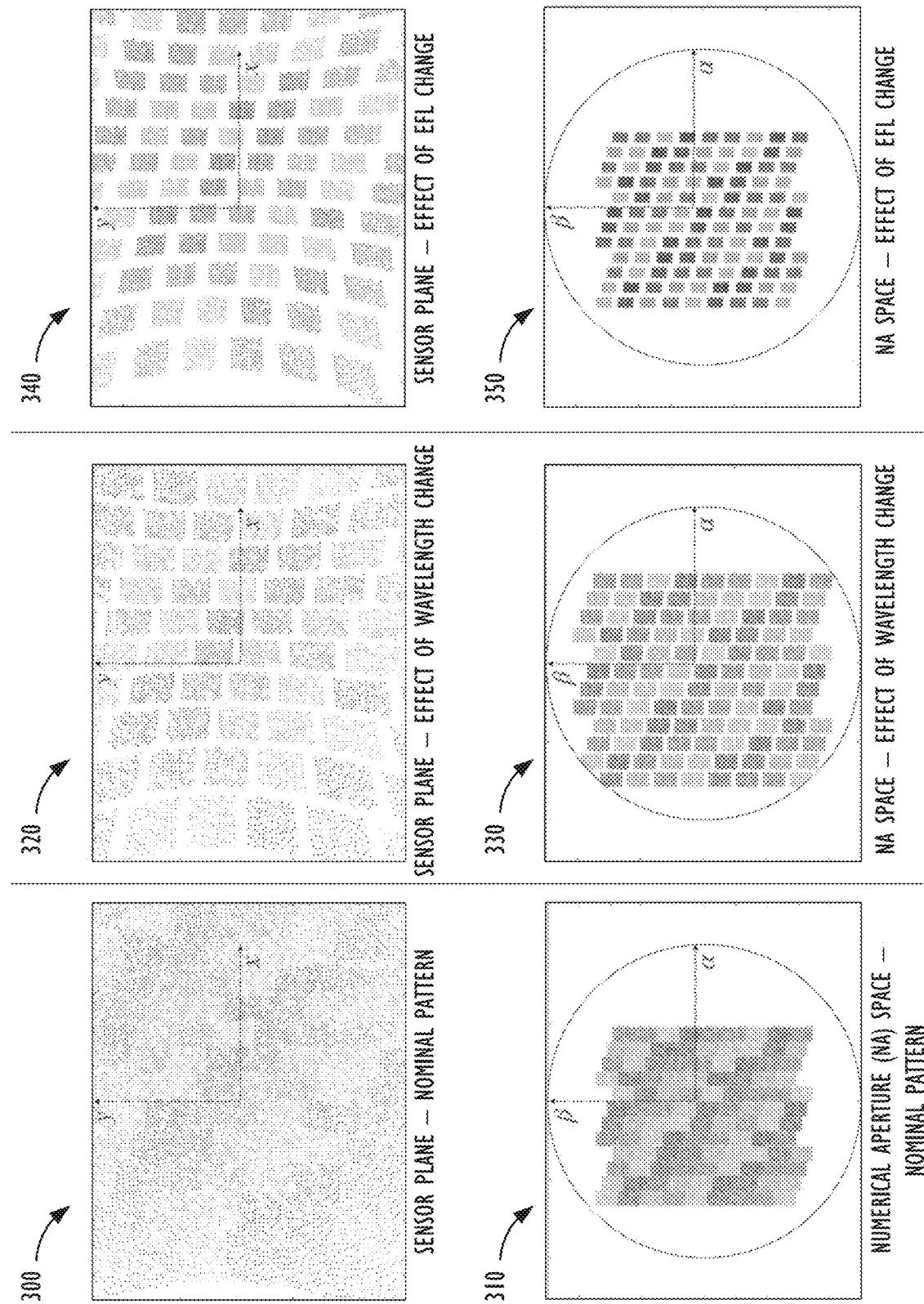
FIGS. 3A-3C illustrate example projected patterns, in accordance with aspects of the present disclosure.

FIGS. 3A-3C illustrate example projected patterns, in accordance with aspects of the present disclosure. As shown in FIG. 3A, at a certain temperature, such as the temperature at which the system was calibrated and a stored reference projected pattern was captured, the projector may project a pattern such as pattern 300 on a flat surface at a certain, known distance. Pattern 300 of FIG. 3A illustrates the projected pattern on the image sensor plane (i.e., in x-y space), whereas pattern 310 of FIG. 3A illustrates the same projected pattern in the projector's numerical aperture (NA) space (i.e., in β-β space). As will be explained in greater detail below, NA space or "direction cosine space," of the projector refers to a coordinate system, wherein spot locations are specified in term of "direction cosines," i.e., rather than spatial coordinates. The transformation of spots into NA space of the projector also results in a periodic tile pattern (e.g., where the tiles have the same size and spacing), which also simplifies correction calculations, as will be described below.

Increasing the temperature inside the projector, however, may cause the projected pattern to become distorted, as shown in the patterns in FIG. 3B and FIG. 3C. The distortion may be due to change in the refractive index and/or thermal expansion of components of the projector. For example, the projector may include a diffractive optical element or prism and thermal expansion and/or refractive index change in the laser cavity may cause a change in a wavelength of the projected pattern where increased temperatures are correlated with increased wavelengths. As shown in the distortion of the reference pattern in patterns 320 (sensor space)/330 (NA space) of FIG. 3B, changing the wavelength of the projected light effectively changes the angle of diffraction, and therefore moves the centers of the tiles. Thus, increased wavelengths may result in increased distance between the centers of the tiles.

As another example, changing the refractive index in a lens of the projector may cause a change in the effective focal length (EFL) of the projector. As shown in the distortion of the reference pattern in patterns 340 (sensor space)/350 (NA space) of FIG. 3C, changes in the effective focal length of the projector may change the dimensions of the tiles, with increased effective focal lengths resulting in smaller tiles and decreased effective focal lengths resulting in larger tiles. This distortion can result in erroneous depth measurements, such as when the elements of the pattern have extensively shifted as compared to elements of the stored reference projected pattern. For example, in a situation where the captured environment is just a flat wall that is identical to (and at an identical distance to) the wall that was captured in the reference image, the light pattern in the captured image should be identical to the light pattern in the reference image and, hence, have zero shifts between corresponding spot locations However, this will not be the case if the projected light pattern has been deformed, e.g., due to temperature changes.

Compensation for the distortion may be performed by using multiple stored reference projected patterns, e.g., stored reference projected patterns captured at various temperatures. However, as the stored reference projected patterns may be specific to a particular projector unit, the multiple reference projected patterns may also be generated at manufacturing or calibration time. Since device temperature control in a mass production scenario is often too slow to be practical, such a solution would result in a substantial increase in the complexity, cost, and the amount of time needed to calibrate the depth measurement system.

Figure 4:
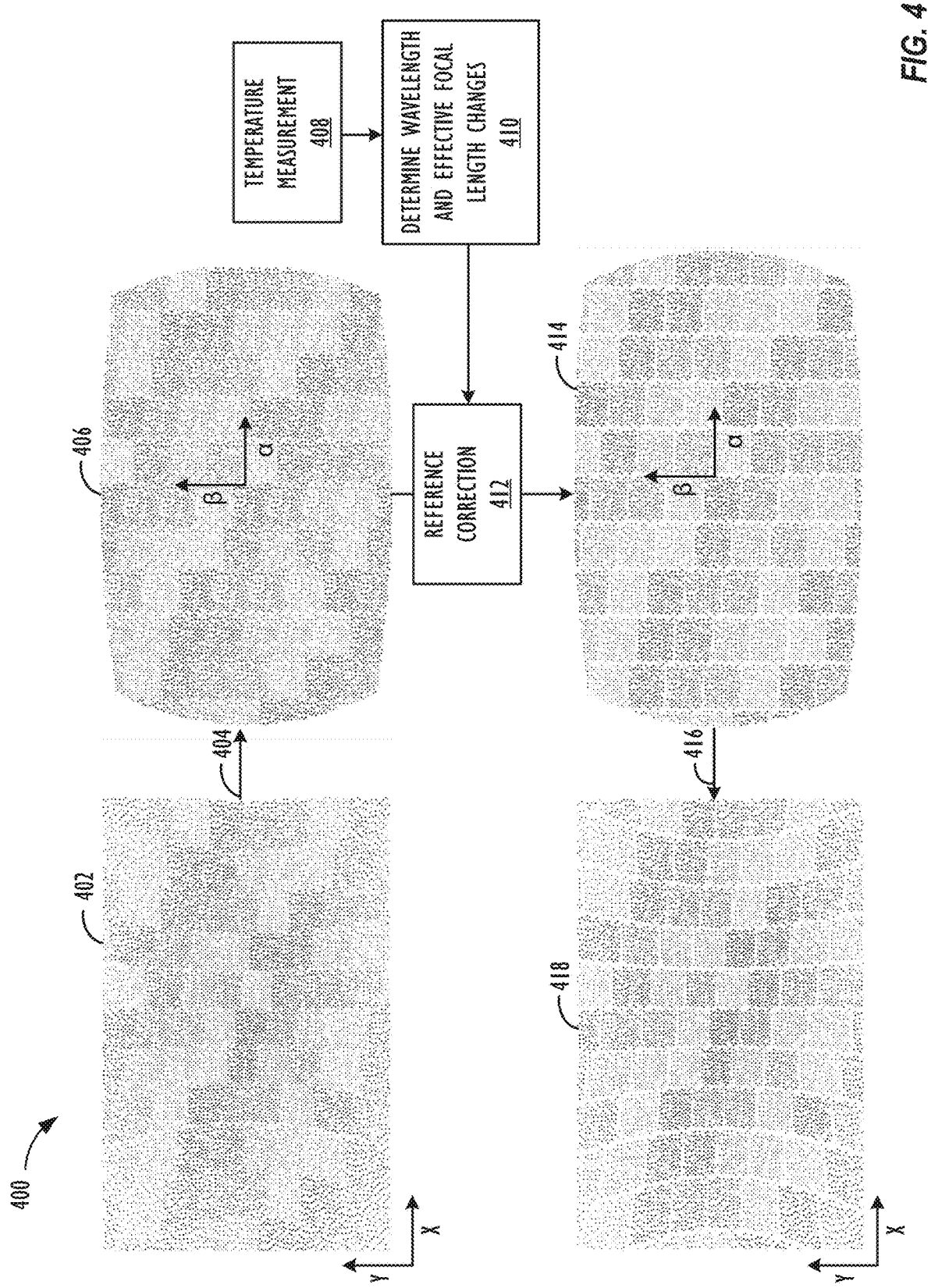
FIG. 4 illustrates an example technique for correcting a reference projected pattern, in accordance with aspects of the present disclosure.

In accordance with aspects of the present disclosure, the stored image of the reference projected pattern may be corrected based on an expected pattern distortion for a given temperature, and this corrected image of the reference projected pattern may be used for estimated depth measurements. FIG. 4 illustrates an example technique 400 for correcting a reference projected pattern, in accordance with aspects of the present disclosure. As shown in FIG. 4, a stored reference projected pattern 402 may be transformed 404 from camera space into numerical aperture space (NA space) 406, also known as "direction cosine space," of the projector, as will be described in greater mathematical detail below. The camera space refers to a coordinate system, such as pixel locations on an X, Y plane, as used by an image produced by a camera. In the pattern in NA space of the projector 406, spot locations are specified in term of "direction cosines," rather than spatial coordinates.

In some implementations, the transformation into NA space may comprise, first, computationally reprojecting the spot centroid coordinates, as estimated from the captured reference image (for example, by applying a peak detection algorithm or neural network), onto a "virtual plane" or "reference plane." The "plane equation" of the "reference plane" is known, since the system will have already been geometrically calibrated. Letting {X,Y,Z} be the intersection coordinates of a spot's reprojected ray with the "reference plane," the vector V={X,Y,Z} may then be transformed to the reference frame of the projector via a "rigid transformation" (e.g., rotation and translation transformations), which is also available from the geometric calibration of the projector. The projector's reference frame (PRF) may be defined by the diffraction grating's intrinsic 'X' and 'Y' vectors. Letting the transformed vector V'={X',Y',Z'}, then {α, β} becomes the spot's coordinates in "NA space" or "direction cosine space," where $$\alpha = \frac{X'}{R'}, \beta = \frac{Y'}{R'}$$

and R'=$\sqrt{X'^2+Y'^2+Z'^2}$. This transformation 404 into "NA space" of the projector also results in a periodic tile pattern (e.g., where the tiles have the same size and spacing), which also simplifies the correction calculations.

According to some embodiments, a diffraction model may be used to represent spot coordinates in NA space. For example, letting a unit vector, V, equal {X,Y,Z} in world coordinates, then the "direction cosines" of the unit vector, V, are defined as:

$$\alpha = \frac{X}{R}, \beta = \frac{Y}{R}, \text{ and } \gamma = \frac{Z}{R},$$

where $R=\sqrt{1X^2+Y^2+Z^2}$, and wherein the 2-dimensional diffraction equations are:

$$\alpha_n = \alpha_0 + \frac{\lambda \cdot n}{d_x}, \beta_m = \beta_0 + \frac{\lambda \cdot m}{d_y},$$

and $\gamma_{nm}=\sqrt{1-\alpha_n^2-\beta_m^2}$, wherein $\lambda$ refers to wavelength, $d_x$ and $d_y$ refer to the diffraction grating pitch in the x- and y-directions, respectively, $\alpha_0$ and $\beta_0$ refer to the direction cosines for a ray incident on the diffraction grating, and n and m refer to the diffraction order (i.e., "tile") indices.

Given such a representation, the amount of positional change in an individual spot's location per effective focal length change in NA space may be given by the following equations:

$$\Delta\alpha_{i,n} = -\alpha_{i,0}\gamma_{i,0}^2 \frac{\Delta f}{f}, \text{ and } \Delta\beta_{i,m} = -\beta_{i,0}\gamma_{i,0}^2 \frac{\Delta f}{f},$$

where "i" denotes the emitter index of the current spot (i.e., which emitter the current spot of light originated from), n and m denote the diffraction order indices, $\alpha_{i,0}$ and $\beta_{i,0}$ are the zeroth-order coordinates in the projector NA space, $\gamma_{i,0}=\sqrt{1-\alpha_{i,0}^2-\beta_{i,0}^2}$ is the third "NA space" coordinate, and f is the projector's nominal effective focal length, and $\Delta f$ is the projector's estimated EFL change for each temperature.

A temperature measurement may be taken at step 408, for example by a thermistor or other temperature sensor. This temperature sensor may be positioned such that it may determine the temperature of components of the projector, such as near a light source within the projector. Based on the temperature measurement, a wavelength and an effective focal length difference may be determined at step 410. In some cases, wavelength and effective focal length differences at different temperatures may be predetermined, for example, based on pre-production component testing or modeling.

For example, how wavelength and effective focal lengths change in response to temperature changes are often consistent for a certain model of projector from a certain manufacturing process, but how the wavelength and effective focal lengths change in response to temperature may differ from manufacturing process to manufacturing process. Thus, how the wavelength and effective focal lengths change based on temperature changes may be determined, for example, experimentally or by simulation, for a certain model and/or manufacturing process of projector, and this information may be stored in a memory associated with the projector. In some cases, the information regarding how the wavelength and effective focal lengths change based on temperature changes may be relative to a certain reference temperature. In fact, it has been found via experimentation that the absolute temperature in components such as the lens can be quite different from unit to unit. However, the effects of differences in temperature, i.e., relative to a certain reference temperature, will be more consistent, and thus provide a more practical approach for the thermal correction techniques described herein.

Based on information regarding how the wavelength and effective focal lengths change for the determined temperature of the components of the projector, a reference correction operation may be performed at step 412 for the pattern in NA space 406 to obtain a corrected pattern in NA space 414. According to some embodiments, the reference correction operation 412 may comprise: 1) using a spot identification algorithm to determine the location and center of mass of the projected light spots; 2) determining, for each spot, to which diffraction order (e.g., to which tile) it belongs, and to which laser emitter it belongs (e.g., to which spot within a tile). Identifying each spot correctly is helpful in using the thermal model and diffraction equations correctly (e.g., because different emitters have different thermal behavior, and different diffraction orders). In some implementations, the spot identification process may be performed by correlating the spots in the original captured reference image to a simulated image, in which the identity of each spot is known in advance.

This reference correction operation 412 may further comprise one or more resampling operations. For example, for each spot, the spot's "original" location and its "final" location (i.e., location after temperature change) are known. Thus, a shift vector may be computed for each spot. Next, a "densification" step may be performed, whereby a matrix may be created that has, in each of its entries, some fractional amount of shift that may be calculated by interpolation (e.g., bilinear, bicubic, natural-neighbor, etc.). The densified shift matrix may then be used to do the actual resampling of the original image. In this way, the individual spots may be shifted by sub-pixel amounts to ensure that the correction does not create discontinuity artifacts in the image. The corrected pattern in the projector's NA space 414 is then transformed 416 back into camera space to generate a corrected reference projected pattern 418. For example, in some implementations, a ray vector, V, may be computationally created from the corrected coordinate of each spot in "NA space", i.e., represented as $\{\alpha,\beta\}$, such that $V=\{\alpha, \beta,(1-\alpha^2-\beta^2)^{1/2}\}$. The intersection point of this ray with the known "reference plane" mentioned above, is transformed to the camera's reference frame (i.e., using the inverse of the "rigid transformation" mentioned above), and then computationally projected onto the camera's sensor plane, based on the camera's known intrinsic parameters, and the wall's geometric model. This corrected reference projected pattern 418 may then be used as a basis of comparison, i.e., instead of the stored reference projected pattern 402, for depth determinations at the determined temperature. This comparison between the corrected reference projected pattern 418 and a captured image with the projected pattern may be performed in a substantially similar manner as when the stored reference projected pattern 402 is used.

In some cases, the corrected reference projected pattern 418 may be stored along with the associated indication of the temperature. For example, as part of the projector's calibration process, after the stored reference projected pattern 402 is captured and stored, different corrected reference projected patterns 418 may be generated for each temperature in a range of relevant device operating temperatures. These different corrected reference projected patterns 418 may be stored along with metadata indicating a corresponding temperature. During use, the temperature of the projector may be obtained and the corrected reference projected pattern 418 associated with a temperature closest to the obtained temperature may be used as a reference pattern for depth determination.

In other cases, the corrected reference projected pattern 418 may be determined dynamically as needed based on a current temperature difference of the projector and the stored reference projected pattern 402, e.g., by blending or interpolating between two or more stored corrected reference projected patterns associated with different temperature differentials, and/or by real-time computation, implemented either by software and/or by dedicated processing hardware.

Figure 5:
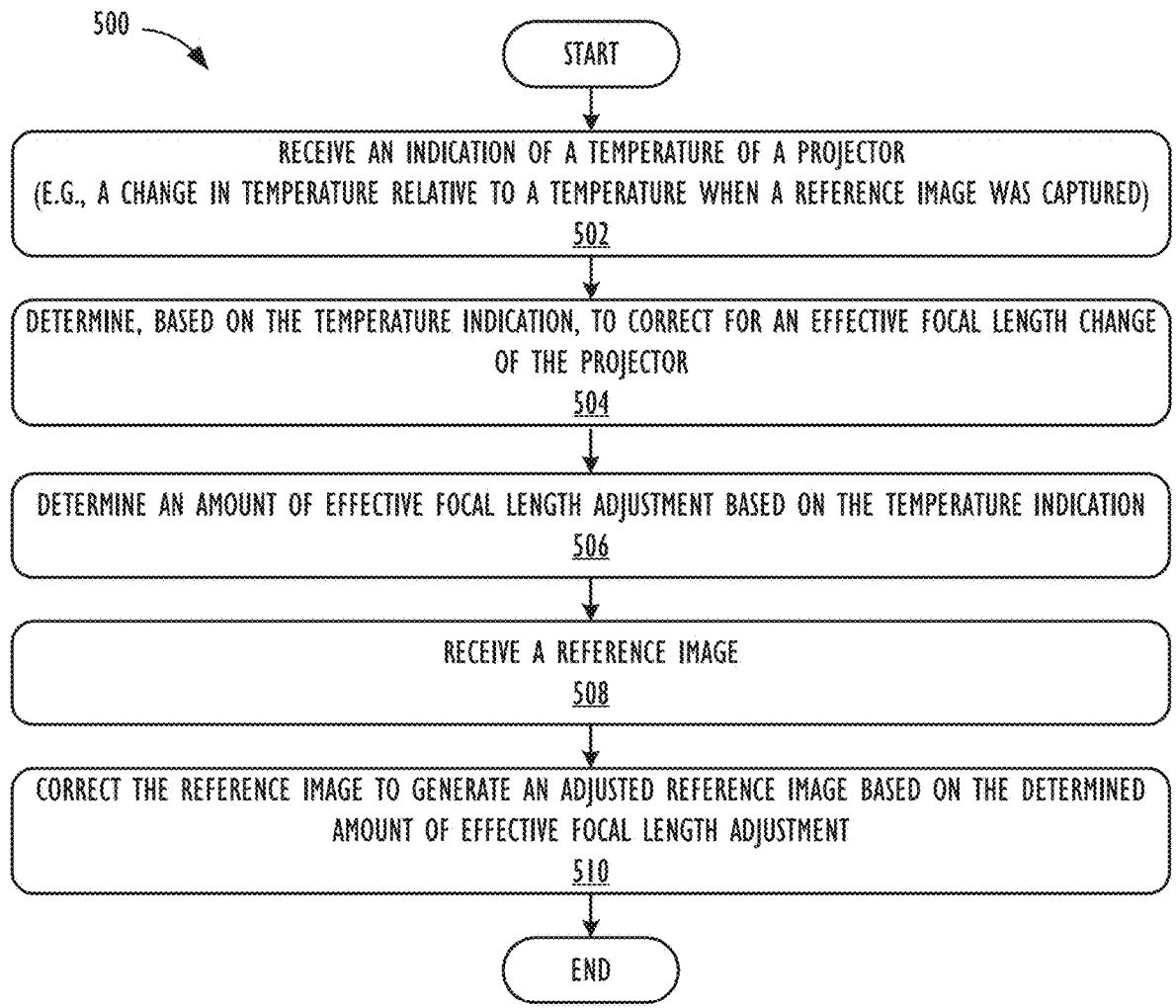
FIG. 5 is a flow diagram illustrating a technique for image correction, in accordance with aspects of the present disclosure.

FIG. 5 is a flow diagram 500 illustrating a technique for image correction, in accordance with aspects of the present disclosure. At block 502, an indication of a temperature of a projector is received (e.g., an actual temperature or a change in temperature relative to a reference temperature for which a reference image was captured and stored). For example, a set of corrected reference images may be generated for a projector from a stored reference projected pattern for different possible temperatures across a range of temperatures. In some cases, the set of corrected reference images may be pre-generated, such as during a manufacturing process. Corrected reference images may be generated for ranges of potential temperatures that the projector may measure during actual usage. This indication of temperature may be passed into, for example, a processor associated with the projector, to process one or more of the stored reference projected patterns based on the indicated temperature. At block 504, a determination is made, based on the temperature indication, to correct for a predicted change in the effective focal length of the projector. For example, in some cases, the received temperature may be compared to a reference temperature associated with the stored reference projected pattern to determine if the differential is greater than a correction differential threshold. If the differential is not greater than the correction differential threshold, then a corrected reference image may not even need to be used.

At block 506, an amount of effective focal length adjustment is determined based on the temperature indication. For example, how much the effective focal length changes in response to temperature may be determined, for example, experimentally or via a mathematical model for various temperatures and stored in a memory. This information may be retrieved from the memory and used to determine the amount of effective focal length adjustment for a given temperature. At block 508, a reference pattern image is received. For example, a reference pattern image may be created and stored as part of manufacturing and/or calibration process for the projector. This stored reference pattern image may be retrieved from the memory. In some cases, the stored reference pattern image may be transformed from camera space to a projector's NA space for ease of manipulation. At block 510, the reference pattern image is corrected based on the determined amount of effective focal length adjustment to generate a corrected reference image. For example, an effective focal length correction may be applied to the stored reference pattern image using the determined amount of effective focal length adjustment. In some cases, the adjusted reference pattern image may be created in the projector's NA space, and the corrected reference pattern image may then be transformed back to camera space. In some cases, the corrected reference pattern image may be stored in a memory along with the indication of the temperature associated with the corrected reference pattern image in a set of corrected reference images.

In some cases, the projector projects a pattern into an environment. An image of the environment may be captured and received, for example, by a processor associated with the patterned beam projector. The image includes the projected pattern. The projected pattern in the image is correlated with the corrected reference image to determine the parallax induced disparity map of the environment in the captured image, from which a depth map may be calculated. In some cases, the corrected reference image is selected from a set of corrected reference images based on a current temperature of the projector and/or indications of a change in the temperature. For example, where corrected reference pattern images associated with temperatures are predetermined and stored in a memory, a current temperature of the projector may be matched against the indications of the temperatures (or changes in temperatures) in the set of corrected reference images, and the corrected reference image associated with the closest matching indicated temperature may be selected. In some other cases, two or more of the corrected reference images may be used to create an intermediate reference image corresponding to an intermediate temperature by means of interpolation, in order to produce an interpolated corrected reference image that is estimated to most accurately approximate what the captured reference image would look like at the projector's current operating temperature.

In still other cases, the effect of an estimated change in effective focal length on the stored reference pattern image for the projector's current operating temperature may be corrected for along with an effect of an estimated change in the wavelength of the projected light beams at the projector's current operating temperature. In some cases, a determination may be made to correct for the wavelength of the light beams being projected by the projector along with the effective focal length of the projector's lens. An amount of wavelength adjustment may be determined based on the temperature indication, and the reference pattern image may be corrected based on the determined amount of wavelength adjustment. For example, changes in wavelength have little effect on tiles near the center of the projector's field of view (e.g., zero order tiles), but tiles at the edge of the projector's field of view move the farthest and are the most sensitive to wavelength changes. These adjustments profiles may thus be modeled, either mathematically or experimentally, such that appropriate reference pattern image corrections may be applied across the field of view of the reference image to account for the varying effect that wavelength changes have on the projected pattern of light.

According to some embodiments, assuming there is a known NA representation for each projected spot, the wavelength correction equations for a given spot with diffraction order {n, m} may be represented as:

$$\Delta\alpha_n = \Delta\lambda \frac{n}{d_x} \text{ and } \Delta\beta_m = \Delta\lambda \frac{m}{d_y},$$

wherein $\Delta\lambda$ refers to wavelength change, and $d_x$ and $d_y$ represent the diffraction grating's pitch in the x- and y-directions, respectively.

Figure 6:
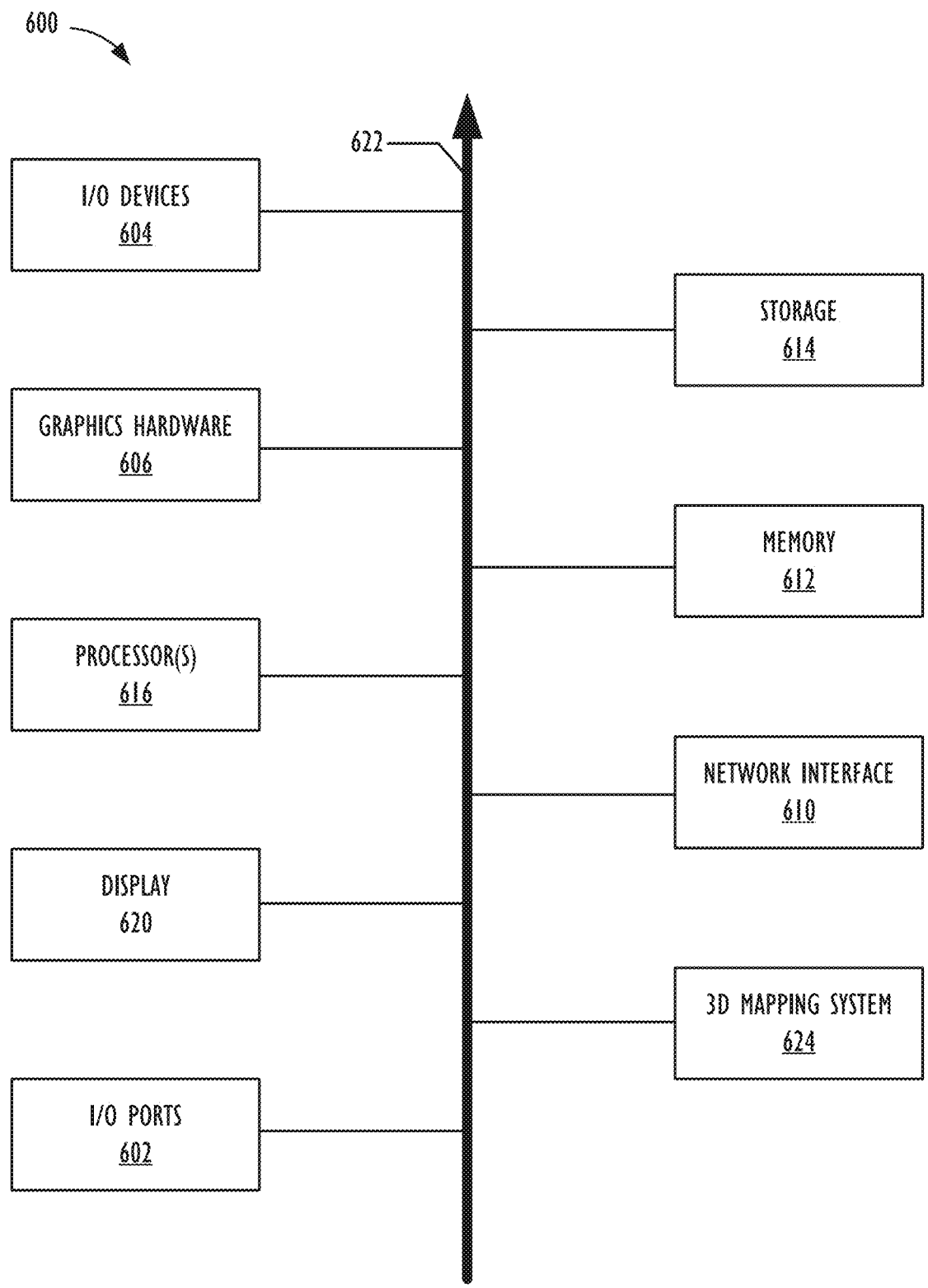
FIG. 6 is a block diagram illustrating a computer system that may be used, for example, as computing device according to an embodiment of the disclosure

Referring to FIG. 6, the disclosed embodiments may be performed by representative computer system 600. For example, the representative computer system 600 may act as a device which includes a projector. While FIG. 6 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 6, computer system 600 includes bus 622 which is coupled to one or more processor(s) 616, which may be CPUs and/or digital signal processors (DSPs), memory 612, which may include one or both of a volatile read/write random access memory (RAM) and a read-only memory (ROM), and a non-volatile storage device 614 (e.g., a solid state storage drive). Processor(s) 616 may retrieve instructions from the memory 612 and/or storage device 614 and execute the instructions to perform operations described herein. Bus 622 interconnects these various components together and also interconnects processor 616, memory 612, and storage device 614 to display 620, I/O ports 602 and peripheral devices such as input/output (I/O) devices 604. I/O devices 604 may be pointing devices such as a mouse or stylus, keyboards, touch screens (e.g., display 620 and I/O devices 604 may be implemented as a single touch-sensitive display), modems, network interfaces, printers and other devices. Typically, Input/output devices 604 are coupled to the system through an input/output controller(s). Computer system 600 includes or is coupled to a 3D mapping system 624, such as the 3D mapping system described in FIG. 1.

Where volatile RAM is included in memory 612, the RAM may be implemented as dynamic RAM (DRAM), which requires continuous power in order to refresh or maintain the data in the memory. Graphic hardware 606 may be special purpose computational hardware for processing graphic and/or assisting processor(s) 616 in performing computational tasks. In some embodiments, graphic hardware 606 may include CPU-integrated graphic and/or one or more programmable GPUs.

Storage device 614 may be a magnetic hard drive, an optical drive, a non-volatile solid-state storage drive, or other types of storage systems, which maintain data (e.g. large amounts of data) even after power is removed from the system (i.e., non-volatile). While FIG. 6 shows that storage device 614 is a local device coupled directly to the rest of the components in the computer system 600, embodiments may utilize a non-volatile storage device which is remote from computer system 600, such as a network storage device which is coupled to the computer system 600 through network interface 610. Network interface 610 may be a wired or wireless networking interface. Bus 622 may include one or more links connected to each other through various bridges, controllers, and/or adapters as is well known in the art. Although only a single element of each type is illustrated in FIG. 6 for clarity, multiple elements of any or all of the various element types may be used as desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A method for image correction, comprising:
    receiving an indication of a temperature of a projector;
    determining, based on the temperature indication, to correct for an effective focal length change of the projector;
    determining an amount of effective focal length adjustment based on the temperature indication;
    determining, based on the temperature indication, to correct for a wavelength of the projector;
    determining an amount of wavelength adjustment based on the temperature indication, wherein determining the amount of wavelength adjustment comprises determining an amount of wavelength adjustment for each of a plurality of light spots projected by the projector, and wherein the amount of wavelength adjustment for a respective light spot of the plurality of light spots is determined based, at least in part, on a diffraction order of the respective light spot;
    receiving a reference image; and
    correcting the reference image to generate a corrected reference image based on the determined amount of effective focal length adjustment and the determined amount of wavelength adjustment.

2. The method of claim 1, further comprising transforming the reference pattern image from a camera space to a numerical aperture space of the projector.

3. The method of claim 2, further comprising transforming the corrected reference image from the projector's numerical aperture space to the camera space.

4. The method of claim 1, further comprising storing the corrected reference image and associated indication of the temperature in a set of corrected reference images.

5. The method of claim 1, further comprising:
    projecting, via the projector, a pattern into an environment;
    receiving a captured image of the environment, the captured image including the projected pattern; and
    comparing the projected pattern in the captured image to the corrected reference image to determine a depth map of the environment in the captured image.

6. The method of claim 5, wherein the corrected reference image is selected from a set of corrected reference images based on a current temperature of the projector stored indication of the temperature.

7. The method of claim 1, wherein the amount of wavelength adjustment for a respective light spot of the plurality of light spots is further determined based, at least in part, on a diffraction grating pitch of the projector.

8. A non-transitory program storage device comprising instructions stored thereon to cause one or more processors to:
    receive an indication of a temperature of a projector;
    determine, based on the temperature indication, to correct for an effective focal length change of the projector;
    determine an amount of effective focal length adjustment based on the temperature indication;
    determine, based on the temperature indication, to correct for a wavelength of the projector;
    determine an amount of wavelength adjustment based on the temperature indication, wherein determining the amount of wavelength adjustment comprises determining an amount of wavelength adjustment for each of a plurality of light spots projected by the projector, and wherein the amount of wavelength adjustment for a respective light spot of the plurality of light spots is determined based, at least in part, on a diffraction order of the respective light spot;
    receive a reference image; and
    correct the reference image to generate a corrected reference image based on the determined amount of effective focal length adjustment and the determined amount of wavelength adjustment.

9. The non-transitory program storage device of claim 8, wherein the instructions further cause the one or more processors to transform the reference pattern image from a camera space to a numerical aperture space of the projector.

10. The non-transitory program storage device of claim 9, wherein the instructions further cause the one or more processors to transform the corrected reference image from the projector's numerical aperture space to the camera space.

11. The non-transitory program storage device of claim 8, wherein the instructions further cause the one or more processors to store the corrected reference image and associated indication of the temperature in a set of corrected reference images.

12. The non-transitory program storage device of claim 8, wherein the instructions further cause the one or more processors to:
project, via the projector, a pattern into an environment;
receive a captured image of the environment, the captured image including the projected pattern; and
compare the projected pattern in the captured image to the corrected reference image to determine a depth map of the environment in the captured image.

13. The non-transitory program storage device of claim 12, wherein the corrected reference image is selected from a set of corrected reference images based on a current temperature of the projector and stored indications of the temperature.

14. An electronic device, comprising:
a memory; and
one or more processors operatively coupled to the memory, wherein the one or more processors are configured to execute instructions causing the one or more processors to:
receive an indication of a temperature of a projector;
determine, based on the temperature indication, to correct for an effective focal length change of the projector;
determine an amount of effective focal length adjustment based on the temperature indication;
determine, based on the temperature indication, to correct for a wavelength of the projector;
determine an amount of wavelength adjustment based on the temperature indication, wherein determining the amount of wavelength adjustment comprises determining an amount of wavelength adjustment for each of a plurality of light spots projected by the projector, and wherein the amount of wavelength adjustment for a respective light spot of the plurality of light spots is determined based, at least in part, on a diffraction order of the respective light spot;
receive a reference image;
correct the reference image to generate a corrected reference image based on the determined amount of effective focal length adjustment and the determined amount of wavelength adjustment.

15. The electronic device of claim 14, wherein the instructions further cause the one or more processors to transform the reference pattern image from a camera space to a numerical aperture space of the projector.

16. The electronic device of claim 15, wherein the instructions further cause the one or more processors to transform the corrected reference image from the projector's numerical aperture space to the camera space.

17. The electronic device of claim 14, wherein the instructions further cause the one or more processors to store the corrected reference image and associated indication of the temperature in a set of corrected reference images.

18. The electronic device of claim 14, wherein the instructions further cause the one or more processors to:
project, via the projector, a pattern into an environment;
receive a captured image of the environment, the captured image including the projected pattern; and
compare the projected pattern in the captured image to the corrected reference image to determine a depth map of the environment in the captured image.

19. The electronic device of claim 14, wherein the corrected reference image is selected from a set of corrected reference images based on a current temperature of the projector and stored indications of the temperature.

20. The electronic device of claim 14, wherein the amount of wavelength adjustment for a respective light spot of the plurality of light spots is further determined based, at least in part, on a diffraction grating pitch of the projector.

\* \* \* \* \*